United States Patent [19]

Takahashi

[11] Patent Number: 5,010,691
[45] Date of Patent: Apr. 30, 1991

[54] WEATHER SEAL FOR A DOOR

[75] Inventor: Kenjiro Takahashi, Dearborn Heights, Mich.

[73] Assignee: The Standard Products Company, Cleveland, Ohio

[21] Appl. No.: 390,776

[22] Filed: Aug. 8, 1989

[51] Int. Cl.⁵ .................................................. E06B 7/16
[52] U.S. Cl. ........................................ 49/482; 49/493; 49/496
[58] Field of Search ................... 49/482, 493, 496, 488, 49/485, 470

[56] References Cited

U.S. PATENT DOCUMENTS

| | | |
|---|---|---|
| 1,566,651 | 12/1925 | Christensen . |
| 1,666,328 | 4/1928 | Dennis ........................... 49/496 |
| 2,260,129 | 10/1941 | Wetzel ........................... 49/496 |
| 2,655,698 | 10/1953 | Chalik et al. . |
| 2,954,592 | 10/1960 | Parsons ......................... 49/482 |
| 3,079,653 | 3/1963 | Cornell . |
| 3,131,441 | 5/1964 | Cornell ..................... 49/493 X |
| 3,250,040 | 5/1966 | Squires ......................... 49/482 |
| 4,447,988 | 5/1984 | Cole et al. ..................... 49/485 |
| 4,447,989 | 5/1984 | Mailand et al. ............. 49/482 X |
| 4,497,137 | 2/1985 | Nelson .......................... 49/496 |
| 4,525,953 | 7/1985 | Stutzman ................... 49/493 X |
| 4,586,552 | 5/1986 | Labelle ..................... 49/485 X |
| 4,771,816 | 9/1988 | Clay, Jr. ......................... 160/235 |

FOREIGN PATENT DOCUMENTS 1248746 10/1971 United Kingdom ................. 49/496

OTHER PUBLICATIONS

U.S. Application Ser. No. 253,963, filed Oct. 5, 1988.

Primary Examiner—Philip C. Kannan
Attorney, Agent, or Firm—Harness, Dickey & Pierce

[57] ABSTRACT

The present invention is a weather seal for a door having a base member secured to the door. A hinge member is pivotally connected to the base member for pivotal movement relative to the base member. A sealing lip is pivotally connected to the hinge member for pivotal movement relative to the base member. The sealing lip includes a plurality of ribs adapted to engage a support surface for varying the width of the sealing lip to effect a seal between the door and the support surface.

7 Claims, 3 Drawing Sheets

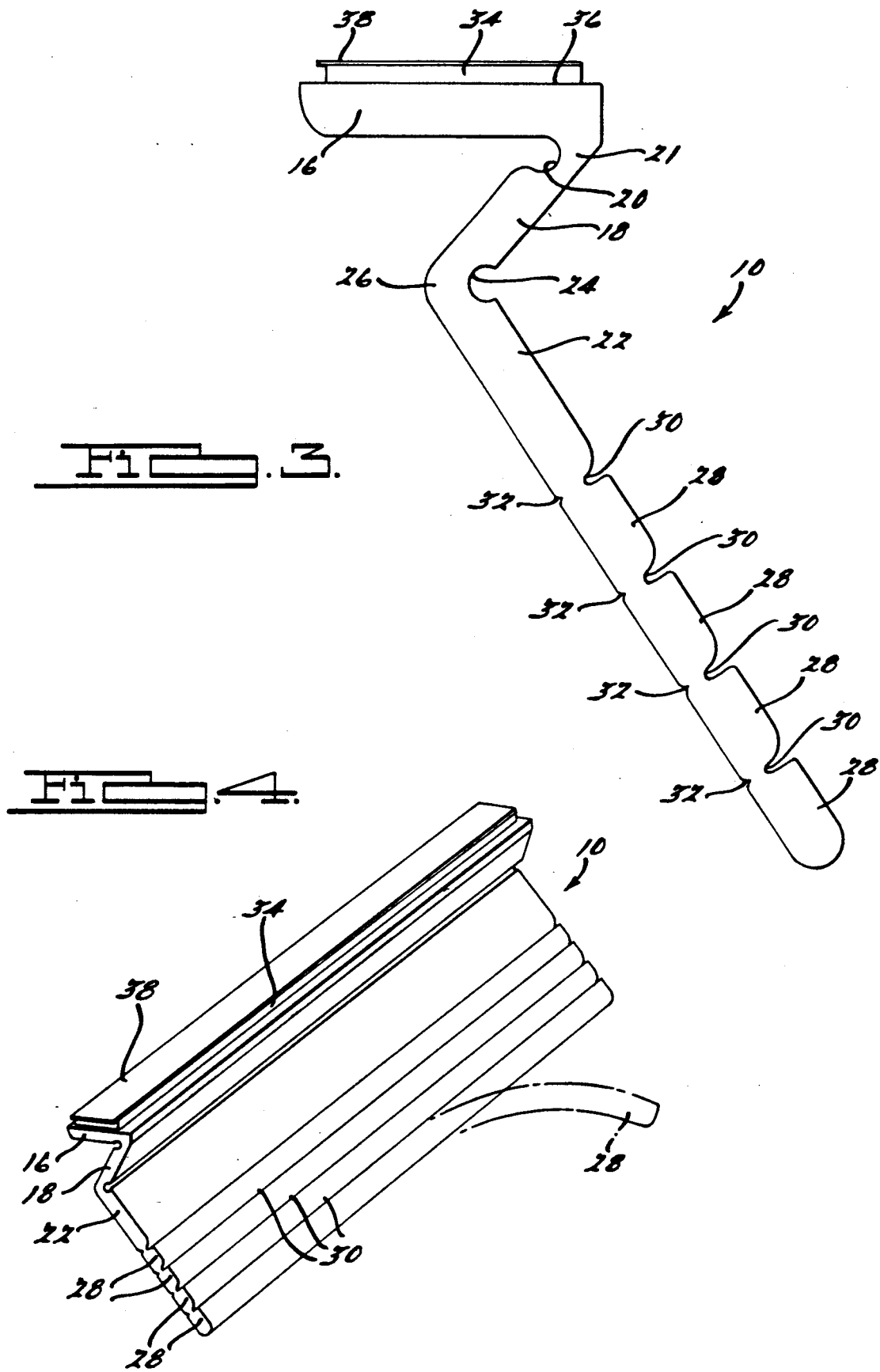

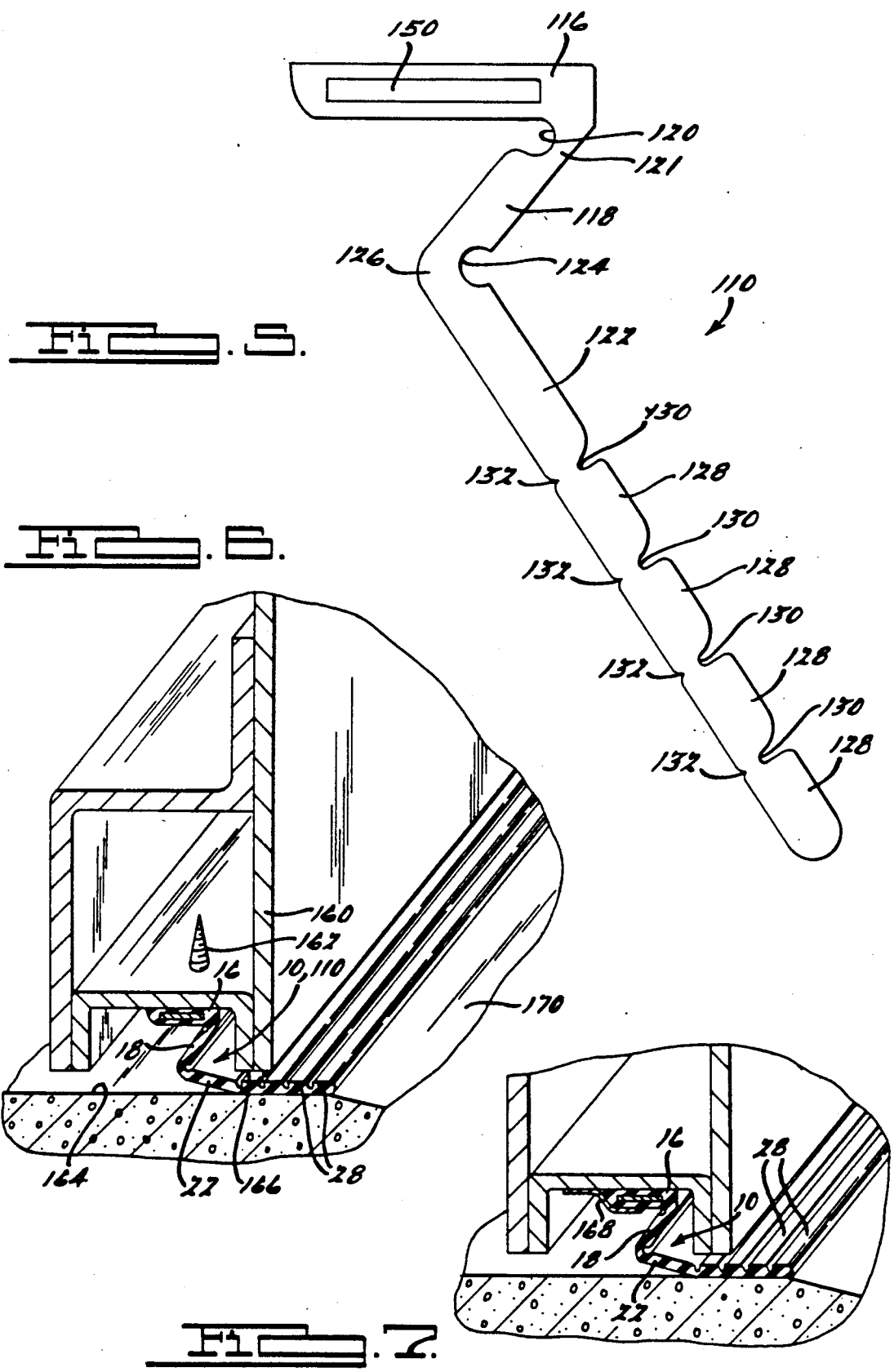

WEATHER SEAL FOR A DOOR

BACKGROUND OF THE INVENTION

1. Field of the Invention

The present invention relates to weather seals, and more particularly, to a weather seal for either a vehicle or garage door.

2. Description of Related Art

Currently, conventional door weather seals are a combination door stop and seal. Most of these weather seals have a rigid base with a flexible sealing lip. The sealing lip generally protrudes from the base at an angle. One problem with this type of weather seal is that the sealing lip has a single or constant width and is sold in cut lengths. This requires an inventory of weather seals having sealing lips of different widths. Also, the weather seal may be a deformable seal which does not provide a large contact region with the support surface. Further, the weather seal is used for a single particular application, for example, a vehicle door or garage door.

It is, therefore, one object of the present invention to provide a weather seal having a sealing lip with a variable width.

It is another object of the present invention to provide a weather seal having a flexible or hinged sealing lip to provide a large contact region with a support surface.

It is yet another object of the present invention to provide a weather seal that can be used for more than one particular application.

SUMMARY OF THE INVENTION

Accordingly, the present invention is a weather seal for a door having a gap between the door and a support surface. The weather seal includes a base member secured to the door and a sealing lip connected to the base member for pivotal movement relative to the base member. The sealing lip has a first position at an angle to the base member when installed and a second position engaging the support surface to effect a seal between the door and the support surface. The sealing lip includes means for allowing the width of sealing lip to be varied.

One advantage of the present invention is that the width of the sealing lip can be varied. Another advantage of the present invention is that the sealing lip is a panel hinged to the base member at an angled position and is flexible to move to another position to provide a large contact region with a support surface. Further, the present invention may be used for either a garage or vehicle door.

Other advantages of the present invention will be readily appreciated as the same becomes better understood by reference to the following description when considered in connection with the accompanying drawings.

BRIEF DESCRIPTION OF THE DRAWINGS

FIG. 3 is an elevational view of the weather seal of FIG. 2.

FIG. 4 is a perspective view of the weather seal of FIG. 3.

FIG. 5 is an elevational view of an alternate embodiment of the weather seal of FIG. 3.

FIG. 6 is a perspective view of the weather seal of either FIGS. 3 or 5 used for a garage door.

FIG. 7 is a perspective view of the weather seal used with a seal retainer for the garage door of FIG. 6.

DESCRIPTION OF THE PREFERRED EMBODIMENT

Figure 1:
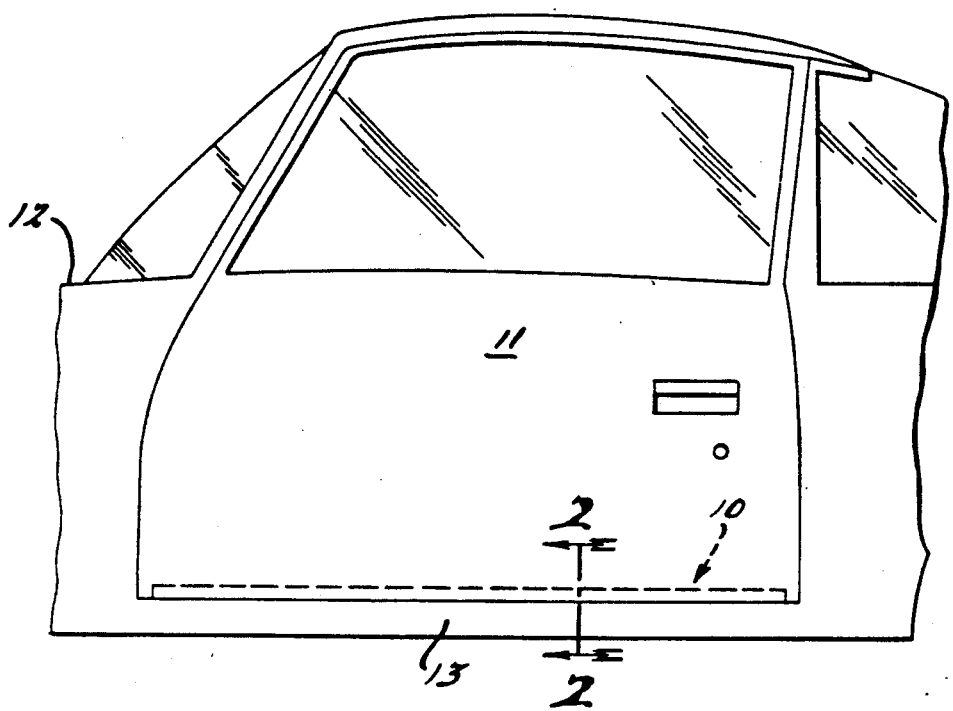
FIG. 1 is a side elevational view of a weather seal according to the present invention installed on all automotive vehicles.
Figure 2:
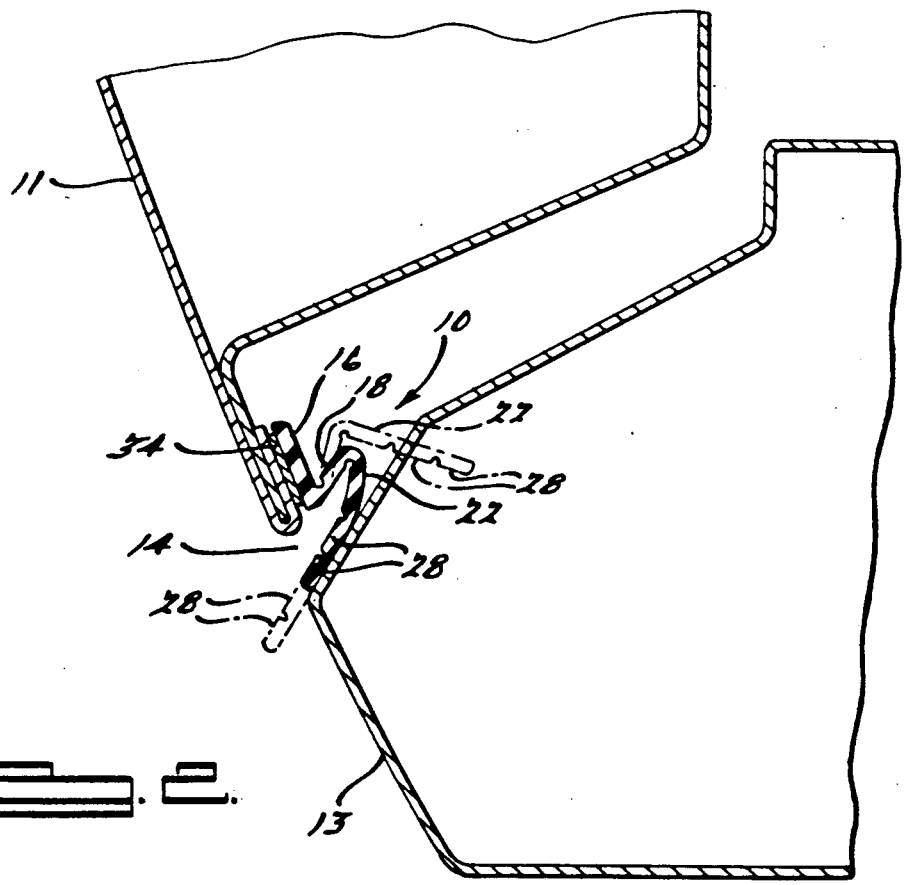
FIG. 2 is a sectional view of the weather seal taken along line 2—2 of FIG. 1.

Referring to FIGS. 1 and 2, a weather seal 10 for a door such as a conventional vehicle door 11 of an automotive vehicle 12 is shown. The weather seal 10 is secured to the bottom of the vehicle door 11 and extends toward a support surface such as a rocker panel 13 of the vehicle 12 to effect a seal across a gap 14 between the vehicle door 11 and rocker panel 13.

Referring to FIGS. 3 and 4, the weather seal 10 includes a base member 16 having a generally rectangular and planar shape. The base member 16 extends longitudinally along the vehicle door 11.

The weather seal 10 further includes a hinge member 18 pivotally connected to the base member 12. Preferably, the hinge member 18 is integral with and oriented at an angle to the base member 16. A first recess 20 is formed between one end of the hinge member 18 and base member 16. The first recess 50 is arcuate in shape. The first recess 20 forms a pivotal portion 21 which is smaller in thickness and is more flexible than the hinge member 18 to allow pivotal movement between the hinge member 18 and base member 16.

The weather seal 10 further includes a sealing lip 22 connected at one end to the hinge member 18. Preferably, the sealing lip 22 is integral with the hinge member 18. The sealing lip 22 has a first position at an angle to the base member 16. In other words, the sealing lip 22 is extruded at an angle opposite to that of the hinge member 18. A second recess 24 is formed between the sealing lip 22 and the hinge member 18 and is arcuate in shape. The second recess 24 forms a pivotal portion 26 which is smaller in thickness and is more flexible than the sealing lip 22 and hinge member 18 to allow relative pivotal movement between the sealing lip 22 and hinge member 18. It should be appreciated that the hinge member 1, and sealing lip 22 extend longitudinally with the base member 16.

The sealing lip 22 includes a plurality of longitudinally extending ribs 28. The sealing lip 22 includes a plurality of transversely spaced and longitudinally extending first and second grooves or notches 30 and 32 formed therein on each side to define the ribs 28. The notches 30 and 32 provide a reduced thickness area that allows for easy tearing or removal of the ribs 28 as illustrated in FIG. 4. To remove excess ribs 28, a snip or cut of approximately 0.00625 is made along the notches 30 and 32. The operator then grasps the rib 28 and by tearing, removes the rib 28 to shorten or vary the width of the sealing lip 22.

The weather seal 10 is made of an elastomeric material such as a thermoplastic elastomer (TPE). The sealing lip 22 is made of an elastomeric material having a hardness similar to the base member 16. It should be appreciated that a softer material could be used for the sealing lip 22 if more flexibility is needed.

Preferably, the weather seal 10 includes a longitudinal strip 34 of pressure sensitive tape on an upper surface 36 of the base member 16. The strip 34 includes release paper or tape liner 38 which is removed prior to application to the bottom of the vehicle door 11.

In operation, referring to FIG. 2, the base member 16 of the weather seal 10 is attached by the strip 34 of pressure sensitive tape by removing the release paper 38 and applying pressure to the base member 16 and strip 34 at the bottom of a vehicle door 11. When the vehicle door 11 is open, the sealing lip 22 has a first position extending outwardly for engaging a support surface 40 of the rocker panel 13. It should be appreciated that the sealing lip 22 is substantially perpendicular to the hinge member 18 when in the first position. When the vehicle door 11 is closed, the sealing lip 22 contacts the support surface 40 of the rocker panel 13 and is pivotally moved or rotated to a second position which is at an angle to the first position. In other words, when the vehicle door 11 is closed, the ribs 28 will contact the support surface 40 and force the sealing lip 22 into an angled position such that the sealing lip 22 is not perpendicular to the hinge mumber 18. The sealing lip 22 is similar to a hinged panel to provide a large contact region with the support surface 40 when the vehicle door 11 is closed. As shown in dotted lines in FIG. 2, excess ribs 28 may extend outwardly beyond the surface contour of the vehicle 12. The excess ribs 28 are removed, as previously described to engage the rocker panel 13 for effective sealing.

Referring to FIG. 5, an alternate embodiment 110 of the weather seal 10 is shown. Like parts have like numerals increased by one hundred (100). The weather seal 110 includes a metal insert 150 disposed within the base member 116. The metal insert 150 is generally rectangular in shape and extends longitudinally along the base member 116. The metal insert 150 eliminates the need for the strip of pressure sensitive tape and provides sufficient rigidity to allow the base member 116 to be secured to the door by fasteners.

Referring to FIGS. 6 and 7, either weather seal 10 or 110 may be used for a garage door 160. The weather seals 10 and 110 are secured to the bottom of the garage door 160 by fastener 162 and extend toward a support surface such as a floor 164 of a garage to effect a seal across a gap 166 between the garage door 160 and floor 164. Alternatively, the base member could be secured by a seal retainer 168 to the bottom of he garage door 160 as shown in FIG. 7.

In operation, when the garage door 160 is closed, the sealing lip 22 contacts the floor 164 and pivotally rotates to the second position as shown in FIGS. 6 and 7. Excess ribs 28 may extend outside beyond the garage door 160 toward a driveway 170. The excess ribs 28 may be removed by snipping and tearing, as previously described, to shorten or vary the width of the sealing lip 22.

The present invention has been described in an illustrative manner. It is to be understood that the terminology which has been used is intended to be in the nature of words of description rather than of limitation.

Obviously, many modifications and variations of the present invention are possible in light of the above teachings. Therefore, the present invention may be practiced otherwise than as specifically described.

What is claimed is:

1. A weather seal for a door having a gap between the door and a support surface comprising:
   a base member adapted to be secured to a surface of the door, said base member extending longitudinally in a plane along the surface of the door;
   a hinge member pivotally connected to said base member for pivotal movement relative to said base member and extending outwardly in a first direction at an angle to the plane of said base member;
   a sealing lip pivotally connected to said hinge member for pivotal movement relative to said hinge member and extending outwardly in a second direction further removed from said base member and at an angle opposite to an angle between said hinge member and said base member and having a first position at an angle to the plane of said base member and a second position to engage a support surface to effect a seal between the door and the support surface;
   said sealing lip including means for varying the width of said sealing lip to a predetermined width to effect a seal between the door and the support surface.

2. A weather seal as set forth in claim 1 wherein said means comprising a plurality of longitudinally extending ribs adapted to engage the support surface.

3. A weather seal as set forth in claim 2 wherein said hinge member includes a recess at each end to allow the pivotal movement between said hinge member and said base member and said sealing lip.

4. A weather seal as set forth in claim 3 wherein said base member includes means for securing said base member to the door.

5. A weather seal as set forth in claim 4 wherein said sealing lip includes means forming a plurality of longitudinally extending notches between said ribs.

6. A weather seal as set forth in claim 5 wherein said weather seal is made of an elastomeric material.

7. A weather seal for a door having a gap between the door and a support surface comprising:
   a base member adapted to be secured to a surface of the door, said base member having a generally rectangular and planar shape extending longitudinally in a plane along the surface of the door;
   a hinge member pivotally connected to said base member for pivotal movement relative to said base member and extending outwardly in a first direction at an angle to the plane of said base member;
   a sealing lip pivotally connected to said hinge member for pivotal movement relative to said hinge member and extending outwardly in a second direction further removed from said base member and at an angle opposite to an angle between said hinge member and said base member and having a first positon at an angle to the plane of said base member and a second position adapted to engage a support surface to effect a seal between the door and the support surface;
   said sealing lip including means for varying the width of said sealing lip to a predetermined width to effect a seal between the door and the support surface;
   said means comprising a plurality of longitudinally extending ribs adapted to engage the support surface; and
   said sealing lip including means forming a plurality of longitudinally extending notches between said ribs.

* * * * *

UNITED STATES PATENT AND TRADEMARK OFFICE
CERTIFICATE OF CORRECTION

PATENT NO. : 5,010,691
DATED : April 30, 1991
INVENTOR(S) : Kenjiro Takahashi It is certified that error appears in the above-identified patent and that said Letters Patent is hereby corrected as shown below:

Column 2, line 26, "recess 50" should be --recess 20--

Column 2, line 44, "member 1" should be --member 18--

Column 3, line 19, "mumber" should be --member--

Column 3, line 45, "he" should be --the--

Column 4, line 15, claim 1, after "position" insert --adapted--

Signed and Sealed this

Twenty-sixth Day of January, 1993

*Attest:*

STEPHEN G. KUNIN

*Attesting Officer*      Acting Commissioner of Patents and Trademarks